July 29, 1924.  
H. S. FRANK  
1,503,122  
MACHINE FOR MAKING MULTIPLE MOLDS AND CASTINGS  
Filed Aug. 29, 1918  5 Sheets-Sheet 1

Inventor  
Harry S. Frank  
By his Attorney  
Paul M. Klein

July 29, 1924.
H. S. FRANK
1,503,122
MACHINE FOR MAKING MULTIPLE MOLDS AND CASTINGS
Filed Aug. 29, 1918   5 Sheets-Sheet 2
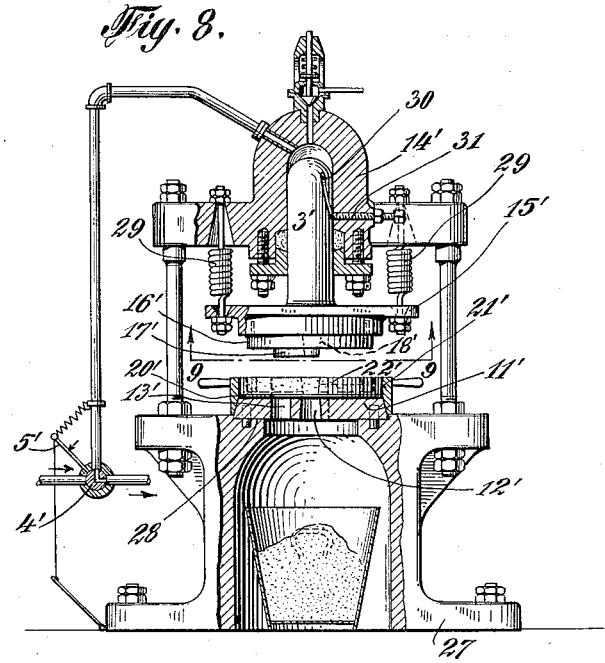
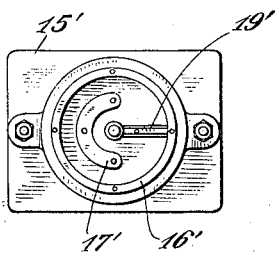
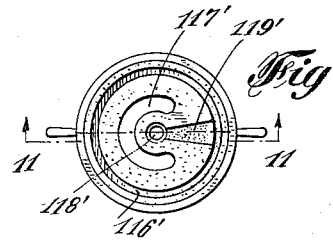
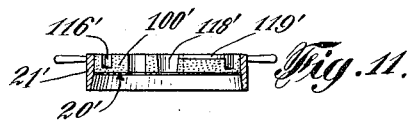
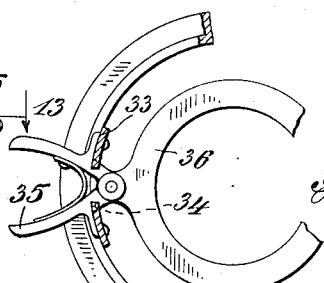
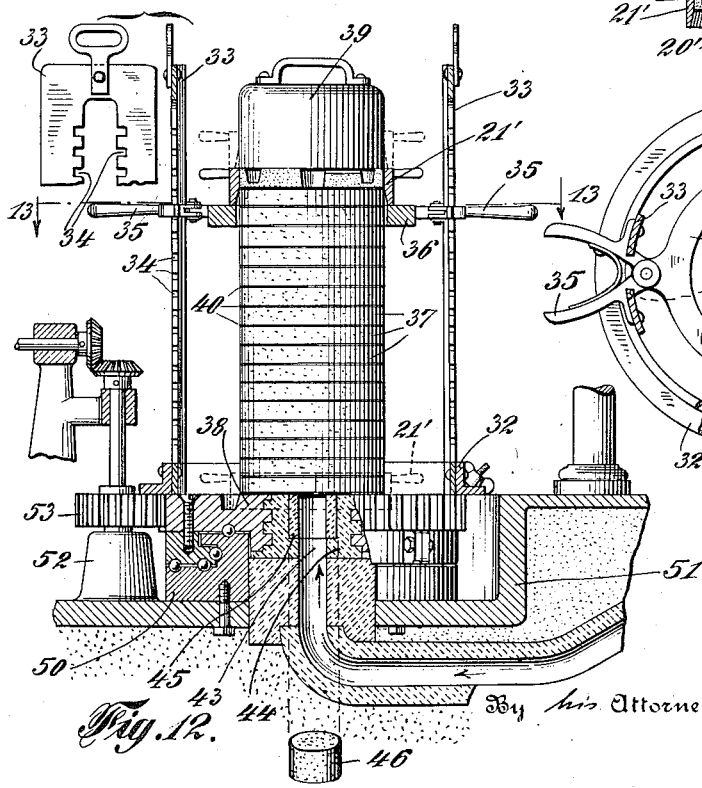
Inventor
Harry S. Frank
By his Attorney
Paul M. Klein July 29, 1924.
H. S. FRANK
MACHINE FOR MAKING MULTIPLE MOLDS AND CASTINGS
Filed Aug. 29, 1918 5 Sheets-Sheet 3
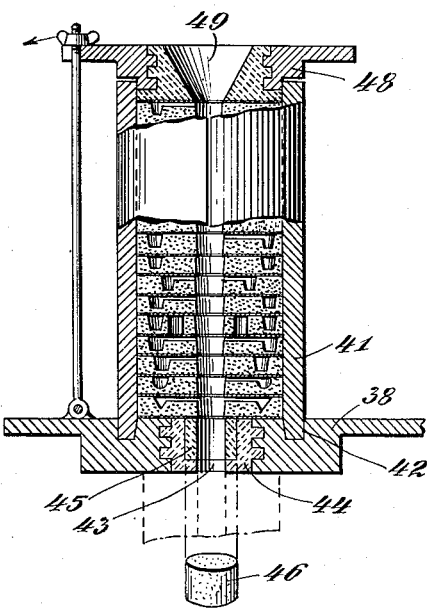
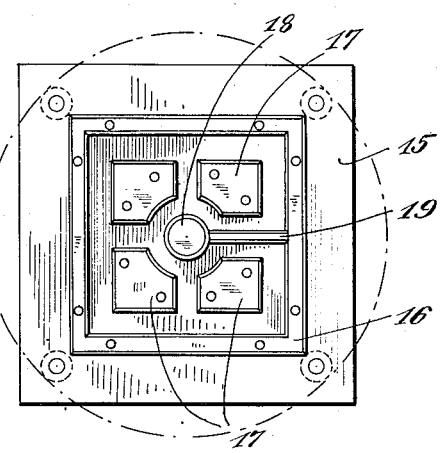
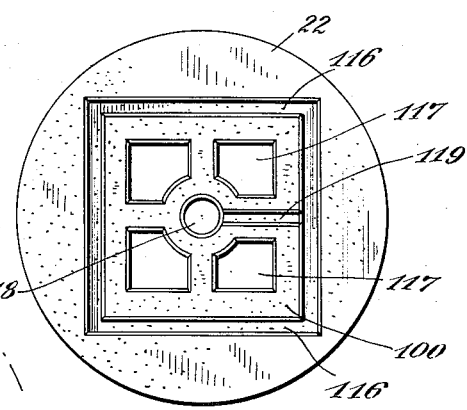
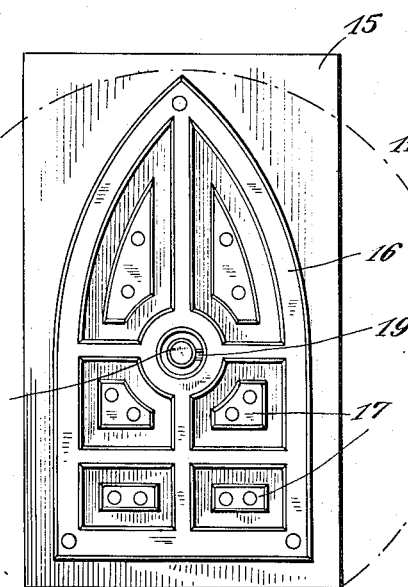
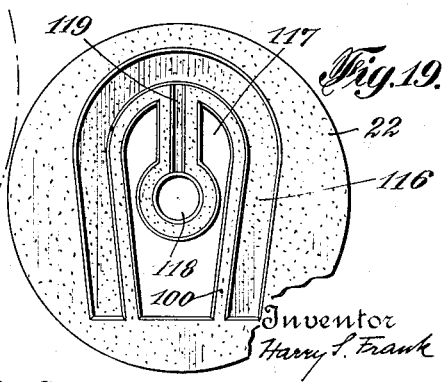
Inventor
Harry S. Frank
By his Attorney
Paul M. Klein

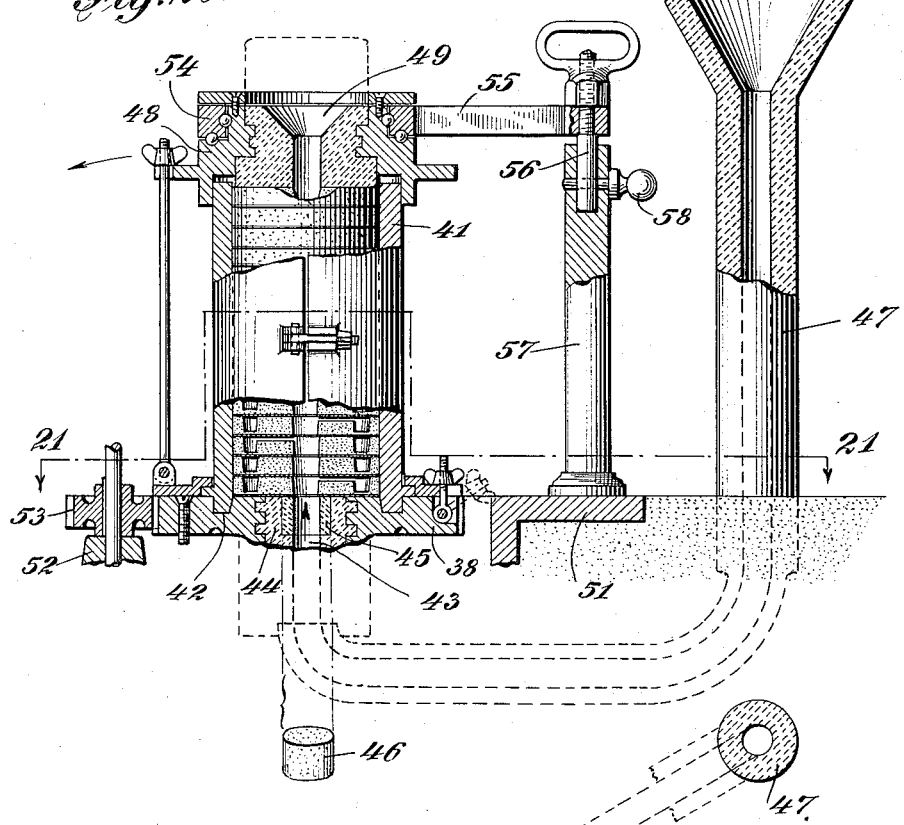
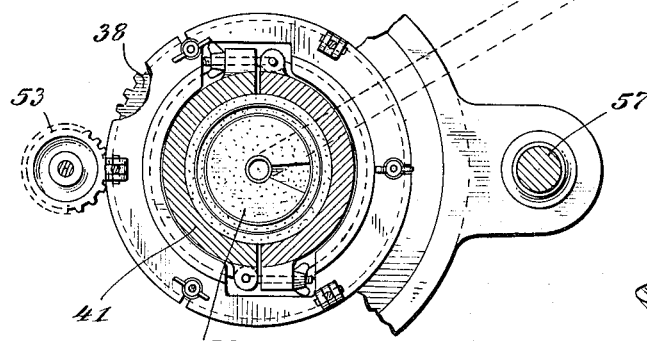
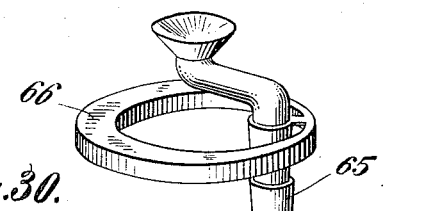

July 29, 1924.

H. S. FRANK

MACHINE FOR MAKING MULTIPLE MOLDS AND CASTINGS

Filed Aug. 29, 1918      5 Sheets-Sheet 5

1,503,122

Inventor
Harry S. Frank
By his Attorney
Paul M. Klein

Patented July 29, 1924.

1,503,122

UNITED STATES PATENT OFFICE.

HARRY S. FRANK, OF ST. LOUIS, MISSOURI.

MACHINE FOR MAKING MULTIPLE MOLDS AND CASTINGS.

Application filed August 29, 1918. Serial No. 251,966.

*To all whom it may concern:*

Be it known that I, HARRY S. FRANK, citizen of the United States, and resident of 5598 Waterman Ave., St. Louis, in the State of Missouri, have invented certain new and useful Improvements in Machines for Making Multiple Molds and Castings, of which the following is a specification.

This invention relates to a set of molding and casting devices for facilitating the making of a multitude of molds and multiple castings, in a quick, novel, and labor saving way.

The objects of this invention are to provide a mold making machine, preferably power driven, which permits the making of one or more molds at a time in quick succession; to provide exchangeable dies and matrices for such a molding machine; to equip said dies and matrices with means for ejecting portions of mold material where desired; to provide means for holding loose mold material and permitting portions of the latter to be ejected when compressed, to provide means whereby the die, after having impressed a desired form into the molding material, may easily leave the finished mold without injuring it; to provide transportable open mold frames to be filled with loose molding material, which when the dies are impressed, becomes a solid mass and adheres to the mold frame, thus permitting its being safely carried.

Other objects are to provide a mold setter permitting the piling up of a number of molds taken from the mold frames; to provide mold separating plates which may be set in between the molds while the latter are being piled up one on the other.

Still other objects of this invention are to provide mold holders enclosing and firmly holding in place a stack of molds preparatory to pouring and during and after the casting operation; to provide means whereby said molds piled up in a stack may be filled from either the bottom or top by molten metal through a common passage formed in the molds; to provide means for rotating said mold holder during the pouring operation when so desired, thus condensing the molten metal at the outer walls of the future casting, and forcing out gas bubbles, forming in ordinary castings, from the outer layer of the casting material.

Foregoing and other objects will be more fully apparent from the following description and the accompanying drawings, forming a part of this specification, but representing only a few of the possible forms, which may be changed or improved without departing from the scope and broad idea of my invention, in which:—

Figure 8 is a side elevation, partly in section, of another molding machine.

Figure 9 is a plan view of a die seen from line 9—9.

Figure 10 is a plan view of a mold frame containing a finished mold.

Figure 11 is a sectional view through Figure 10 on line 11—11.

Figure 12 is a side elevation partly in section, of part of a rotary mold holder and of a removable mold setter.

Figure 13 is a sectional view of the mold setter on line 13—13 of Figure 12.

Figure 14 is a perspective view of a refractory mold separating sheet.

Figure 15 is a side elevation, partly in section, of a stationary mold holder, showing various finished molds enclosed therein.

Figure 16 is a plan view of a molding die for a square casting.

Figure 17 is a plan view of a finished mold for a square casting.

Figure 18 is a plan view of a molding die for an iron stand.

Figure 19 is a plan view of a finished mold for a horse shoe casting.

Figure 20 is a side elevation, partly in section, of a mold holder arrangement ready for receiving molten metal.

Figure 21 is a sectional view through Figure 20 on line 21—21.

Figures 27, 28, 29 and 30 represent perspective views of various forms of tree castings.

Figure 1:
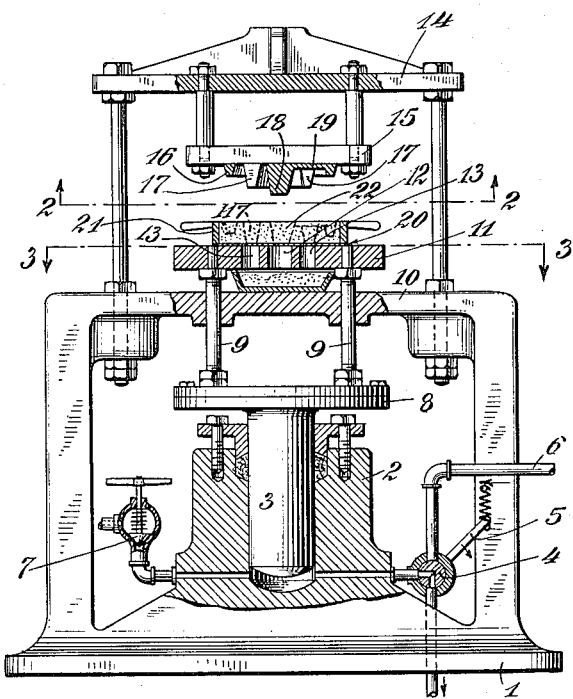
Figure 1 is a side elevation, partly in section, of a molding machine.
Figure 2:
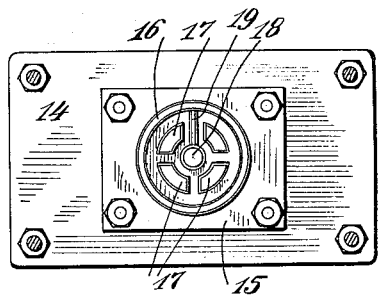
Figure 2 is a sectional view taken on line 2—2 of Figure 1, showing a molding die.
Figure 3:
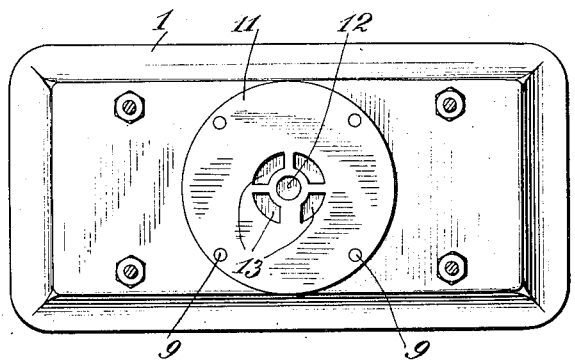
Figure 3 is a sectional view taken on line 3—3, showing a matrix.

Referring to Figures 1, 2 and 3, a pedestal 1 possesses a central extension 2 in which a hydraulic piston 3 is operated by means of a valve 4. This valve may be turned by way of lever 5 held in such a position as to prevent the motive force for operating the piston from voluntarily entering behind the same. When turned down the lever 5 will cause the valve openings to register with the supply pipe 6 and permit the pressure fluid to operate the piston. When released the lever causes the valve to turn, permitting the fluid to escape. A safety valve 7 prevents the fluid, operating the piston, from exceeding a desired pressure, thus safeguarding the machine against damage.

Mounted on the piston 3 is disc 8 to which guide rods 9 are fastened. These guide rods pass through the frame top 10 and receive at their upper ends an exchangeable matrix 11, provided with a center aperture 12 and side apertures 13. These apertures 13 vary in shape and size and may be left out if so desired. At the upper part 14 of the machine frame an exchangeable die holder 15 with a die 16 faces the matrix and has elevated portions 17 extending beyond the die. At the center of the die a cone shaped boss 18 registers with the central aperture 12 of the matrix 11. A bridge 19 connects the boss 18 with the die form 16. On top of the matrix and covering all the apertures a perforable mold separating sheet 20 is placed, whereafter a mold frame 21 is set upon the matrix and filled with molding material 22.

When the piston 3 is operated the mold frame is elevated against the die holder 15, the elevated portions 17 and 18 of which press upon portions of the mold material resting upon the separating sheet 20 and situated above the matrix apertures 12 and 13. As the pressure increases sheet 20 breaks and permits the ejection of a desired quantity of the mold material. The projections 17 and 18 now fill the free spaces 117 in the mold material and prevent further material from leaving the mold frame when the die 16 and the connecting bridge 19 are impressed therein. When the pressure behind the piston reaches its desired maximum the mold material is sufficiently compressed to form a solid mass adhering to the mold frame 21 and the finished mold is ready to be removed from the matrix 11.

Figure 4:
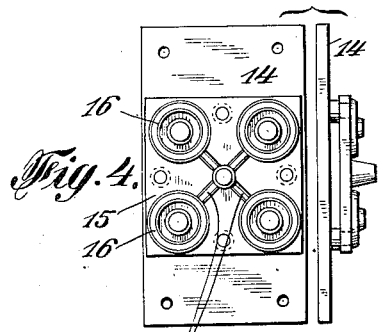
Figure 4 represents a bottom view and side elevation of a multiple die.
Figure 23:
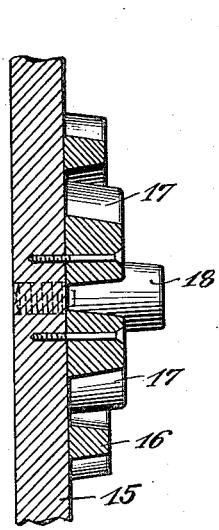
Figure 23 is a sectional view through Figure 22 on line 23—23.
Figure 22:
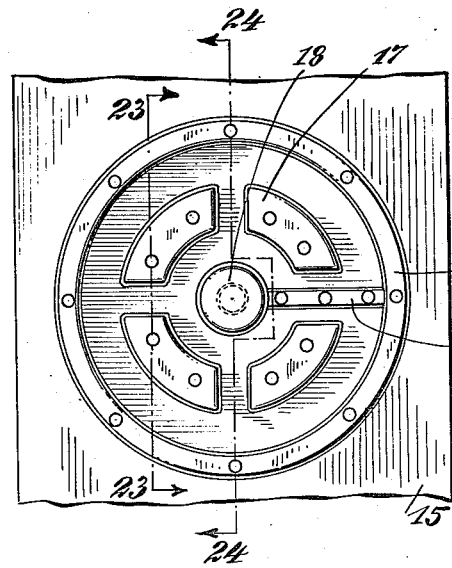
Figure 22 is a plan view of a die for a ring casting.
Figure 24:
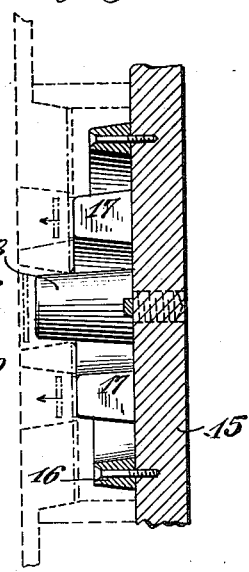
Figure 24 is a sectional view through Figure 22 on line 24—24.

Any number of mold shapes may be made on such a machine in a very short time and various forms of dies (as for instance illustrated in Figures 4, 16 and 18) may be used in combination with corresponding matrices to produce a multitude of mold shapes and castings, different shapes of which are shown in Figures 10, 11, 15, 17, 19, 25, 26, 27, 28, 29 and 30.

In Figures 16, 18, 22, 23, and 24 molding dies are illustrated possessing besides a center boss 18 a number of projections 17, both boss and projections extending beyond the die forms 16 and the connecting bridge 19. The object of the projections 17 is, as explained above, to eject portions of the mold material. This is done for the purpose of creating comparatively thin walls 100 in the mold, adjacent to the inside walls of the recesses 116, impressed by the die forms 16. When the metal, poured into the molds, is cooling off, it is bound to shrink. The shrinking takes place not only in the mass of the metal, but affects, to a considerable degree, the perimeter of the cast form, reducing same in the direction toward the center. The shrinking force, thus diminishing the size of the casting, is so great, that if the mold material did not give way, the casting itself would break. The thin walls, 100 formed in the mold, by ejecting portions of the mold material through the elevated portions 17 are intended to offer the smallest possible resistance to the shrinkage force exerted thereupon by the cooling off casting and to collapse so as to save the casting from breaking.

The boss 18 also is intended to eject portions of the mold material, however, the apertures 118 thus formed serve to create a through passage for a number of molds stacked up in a pile, as will be explained later.

The bridge 19 connecting the boss 18 with the molding die 16 impresses into the mold a shallow recess 119 forming a passage from the mold aperture 118 to the impressed recess 116.

Figures 8, 9, 10 and 11 relate to another molding machine similar to that shown in Figure 1.

The base machine frame 27 possesses a recess 28 for receiving an exchangeable matrix plate 11' upon which sits a removable mold frame 21'. A separating sheet 20' rests upon the matrix in the same way as indicated in Figure 1, covering the apertures 12' at the center and 13' around the center of the matrix plate 11'. The filling of the mold material 22' into the mold frame 21' takes place as described previously. The upper machine frame 14' houses a hydraulic piston 3' operated by means of valve 4' and lever 5'. A die holder 15' connected with the piston 3' possesses a molding die 16', a concentric projection 17' and a center boss 18'. Connecting the die holder 15' with the upper machine frame 14' is a pair of helical springs 29, the ends of which are so fastened to their respective supports as to permit a free motion of the springs in any direction. With a groove 30, describing part of a shallow helix and made into the piston 3', registers a removable guide screw 31.

When fluid under pressure is admitted behind the piston 3', the piston not only moves out of its cylinder, but simultaneously turns slightly due to the action of the guide upon the groove. This turning motion causes the springs 29 to turn with the die holder 15' and to lengthen as the piston travels outward. Thus the springs 29 are subjected to a double tension, which force causes the piston 3', when the fluid is allowed to freely escape, again to travel back into its original place, turning in opposite direction to that taken when being forced out.

It is obvious what happens. The molding die 16' turning while being impressed into the mold material and while being lifted from the finished mold, slides in and out of the impressed mold form, thus assuring the leaving of same without causing any injury to the finished mold. This way of molding permits the molding dies to have straight sides. Straight side dies cannot be used when they are to be lifted from the finished molds in straight upward or downward way, as is the case in a machine illustrated in Figure 1. Dies for such molding machine are preferably made with a slight taper. Straight dies and consequently resulting straight mold forms have the advantage of producing a "straight side" casting requiring but little or no machining in order to face the sides of the casting, which labor becomes unavoidable when using tapered dies.

While the die holder 15' is turning, the elevated portion 17' and the connecting bridge 19' are also slightly turning. The turning portion 17' produces an aperture 117' in the mold longer than itself, and if too long, would cut out an entire disc in the mold. It is necessary therefore to make this portion 17' considerably shorter than the future recess it is to make in the mold, as can be seen by comparing Figures 9 and 10. The connnecting bridge 19' when turning, produces a sector shaped recess 119' in the mold, which permits the molten metal to slow down when being poured into the mold, which is considered advantageous in casting practice.

Figure 5:
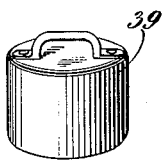
Figure 5 is a perspective view of a weight used for extracting the ready mold from its frame.
Figure 6:
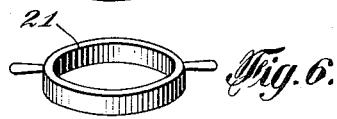
Figure 6 represents a perspective view of convenient form of a mold frame.
Figure 7:
Figure 7 is a perspective view of a mold separating sheet.

In Figures 12 and 13 a removable mold setter is shown. Mounted upon a base flange 32 are two slotted upright guides 33 having at their top handles for permitting them to be carried from place to place. On their slotted portion the guides have notches 34 for receiving spring operated lock handles 35. These handles 35 are connected opposite each other on the center line of a mold frame rest 36. Such or a similar mold setter may be used to advantage for piling up a number of molds 37 into a stack preparatory to casting. When the mold is finished on either one of the aforementioned molding machines, the mold frame with the ready mold is removed from the machine and placed upon a mold seat 38, as indicated in dashed lines in Figure 12. Then a weight similar to that shown in Figure 5 is placed upon the mold. The weight being of somewhat smaller width than the mold frame holds down the mold while the mold frame is lifted. In order to facilitate the setting of the next mold upon the first one put into place, the mold frame rest 36 is slid down to its lowest position. The conically cut lower portion of the mold frame which registers with, first, the matrix plate 11' and then with the mold seat 38, thus permitting a true setting of the first mold, covers the first set mold entirely when the frame is set upon the frame rest. The mold in the frame truly sets upon the first mold. Then the weight 39 is placed upon the mold allowing the frame to be removed. This process is repeated until the required number of molds is stacked up. In order to prevent the molten metal from filling any of the apertures in the molds intended to be free, a separating plate indicated at 40 and shown in Figure 14 may be placed between the molds. Such plates or sheets are preferably made of refractory material. The separating sheet 20', (Figures 8 and 11) placed upon the matrix before the mold is made and carried and set with the mold, will prove of great advantage when made of inflammable material. Paper may be used. When the molds are ready for pouring and molten metal fills the mold forms, the paper sheets will burn up, thus providing a passage for the mold gases.

In order to prepare the piled up molds for pouring, the mold setter is carefully removed and a split hull 41 (Figures 15, 20 and 21) is set into a recess 42 of the mold rest 38, enclosing the entire mold stack from all sides. The hull 41 is made preferably in a cylindrical form, however, the shape may vary with that of the molds.

The mold seat 38 may be stationary (Figure 15) or rotary (Figures 12, 20, and 21). At the center of the mold seat an aperture 43 is provided in a center block 44 made of refractory material, which latter may be used for several casting operations. The upper portion of the aperture is widened to receive either a nipple-like cylinder 45 or a plug 46. The former is used as passageway for the molten metal when poured from the bottom by way of a receiver pipe 47 connected with the aperture 43 (Figures 20 and 21). Plug 46 takes the place of the nipple 45 when it is desired to pour from the top into the molds. Placed on top of the molds and connecting with the hull 41 is a head or mold cover 48. At its center a funnel shaped aperture 49 is provided in a block of refractory material (Figures 15 and 20) serving either as pouring place when plug 46 is inserted in the enlarged portion of the mold seat opening 43, or may be used for inspecting when the pouring is done from the bottom through nipple 45, then placed into the mold seat opening 43. The mold cover 48 is securely fastened to the base plate or mold rest 38, preferably by way of hinged bolts and wing nuts, as indicated in Figures 12, 15, 20 and 21. Sometimes it becomes desirable, while pouring or after pouring, to rotate the molds in order to condense the molten material at its outer surface, causing the formation of a closer grain at the outer walls of the castings and the elimination of gas bubbles in the metal. For this purpose the base 38 may take the form of a gear wheel (Figures 12, 20 and 21) rotatably mounted upon a stationary bearing plate 50, resting on a tray 51. Upon a boss 52 on the tray 51 sits a driving pinion 53 which engages the teeth of the rotatable mold seat 38, being driven by any convenient power source. The mold cover 48 of the rotatable mold holder is guided, when in motion, by a removable ring 54, which forms a part of a connecting brace 55, at the end of which a pin 56 is provided. The pin fits into an opening of a rigid standard 57 which is permanently attached to the base tray 51. A removable locking pin 58 prevents the pin 56 from leaving the standard 57 and holds the guide ring 54 in alignment with the mold cover 48. (Figures 20 and 21.)

After the pouring of melted metal into the molds has taken place while the molds were either in dormant condition or rotating, the cooling off of the molds takes place in the usual manner. It may, however, be advantageous when rotating the molds, to cause their cooling while in motion. An artificial cooling might be preferred while casting certain articles requiring a quick chill, and provision may be made to obtain such an effect. While it is not shown in the drawings, water cooling jackets or air cooled ribs may be provided in connection with the mold holder.

The castings produced by the foregoing method, by using molding machines similar to or such as illustrated for making single or multiple molds, mold setters for setting the molds into a stack, and mold holders, either stationary or rotary, similar to or such as shown in the drawings, may acquire various shapes as shown in Figures 25, 26, 27, 28, 29 and 30 according to the mold used. All these castings, however, adhere to the general tree-like form, which is novel in the casting industry. The main characteristics of these castings are a trunk 59, preferably but not necessarily at the center, surrounded by a number of casting forms 60 in distinct layer relation to and connected with the trunk by way of one or more cast bars 61, representing the filled in connecting passages between the general pouring passages, common to all molds, and the mold forms.

Figure 25:
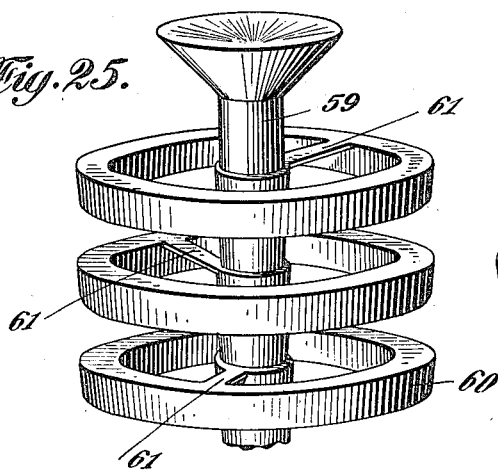
Figure 25 is a perspective view of a tree casting.
Figure 27:
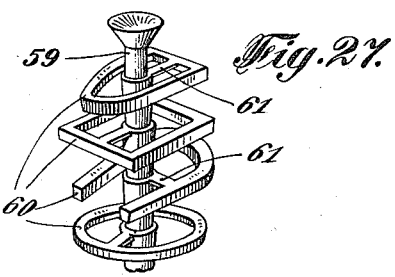
Figure 26:
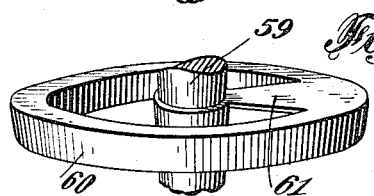
Figure 26 is a perspective view of a part of another tree casting.
Figure 29:
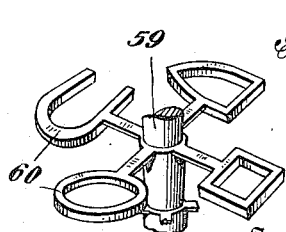

The connecting bars 61 are set at various angles to each other, especially when the tree casting is made in a rotary mold holder, so as to balance and evenly distribute the rotating mass, in order to prevent any distortion and strains due to unbalanced masses in rotary motion. While the tree casting may consist of a trunk having a plurality of single similar molds surrounding it at different altitudes, as illustrated in Figures 25 and 26, it is also practicable to cast various single casting forms around the trunk similar to that shown in Figure 27. Another form of tree casting may result by employment of mold forms like that indicated in Figure 4, producing a tree casting with radially connected cast forms resembling the one shown in Figure 29.

Figure 28:
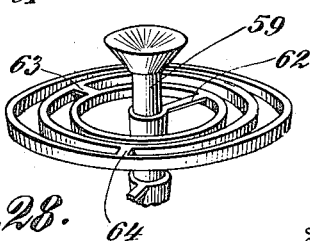

When making symmetrical castings of various sizes, but of similar shapes as for instance, those having triangular, square, rectangular, elliptical, circular and other like forms, tree castings similar to that shown in Figure 28 may prove advantageous in production of multiple castings.

In this way the trunk is connected directly with the smallest and nearest casting form by a connecting bar 62, the next larger casting form is joined to the smallest by another bar 63, the still larger form by bar 64 to the second and so on.

As said above the trunk need not be at the center of the tree casting, particularly when the mold holder is not rotated. In some cases, however, it is required to locate the trunk out of center. This becomes essential when making tree castings in a rotary mold holder with molds for cast forms of uneven thickness, as for instance, rings with eccentric walls shown in Figure 30. The trunk 65, then placed out of center, serves as counter balance for the enlarged ring portion 66, while the molds rotate.

The foregoing description of my invention serves to explain the functions and forms of the various devices necessary for making multiple molds and castings, but their operation or construction may vary and may be changed to meet different conditions. The invention is therefore not restricted to the forms and manner of operation as shown and described, nor to products made by the above described process of manufacture. There is no claim made in the present application for the process of manufacture.

I claim as my invention:—

1. The combination in a set of molding and casting devices for making multiple molds and castings, of a cylindrical and rotatable mold holder, consisting of a divided shell enclosing a pile of molds preparatory to pouring, a base or mold rest, and a head or mold cover, both interlocking with said shell, and means for permitting a quick assembling and demounting of all said parts.

2. A mold holder consisting of a cylindrical rotatable base member equipped with a pouring hole made into an inlay of refractory material, detachable receiving walls for securely holding in place, a pile of molds, connected to said pouring hole by central passages, a cover resting upon the uppermost mold and equipped with a funnel for pouring or inspecting, formed into refractory material, locking means permitting a quick assembling and demounting of parts and pressing said molds together preparatory to, during, and after the pouring operation, and before the molds cool off.

3. The combination in a set of molding and casting devices for producing multiple molds and castings, of a mold holder, consisting of an annular base or mold seat, a divided hull, equipped with locking means, and closing around a stack of molds, an annular head or mold cover, mounted on top of the molds and registering with said hull, locking means for fastening said hull to said base and means for compressing the mold stack through tightening the head to said base, a stationary guide keeping said head in true position, said base and said head having apertures for pouring melted metal into the molds while either dormant or in motion.

4. A mold holder consisting of a concentrical base or mold seat having means for permitting it to be rotated during the casting operation, said mold seat mounted on a base tray, driving means engaging the mold seat, also mounted on the tray, the mold seat and tray possessing pouring holes formed into refractory blocks, said holes connecting at one end to a pouring tube ending into a receiving funnel, at the other end issuing into the center passage of a mold stack, a sectional hull, equipped with locking means, for embracing a stack of molds, means for firmly and quickly attaching said hull to said mold seat, a rotatable mounted head sitting on top of the mold stack and covering the upper portion of said hull, means for securely holding down said head, thus compressing the molds, a standard for holding said head in true position during motion, a funnel shaped opening in said head, formed into refractory material, imbedded at the inner walls of the head, said opening connecting through the center passages of the molds with the pouring pipe, said pouring tube and said head funnel permitting the filling of the molds by molten metal from either top or bottom.

5. A mold holder, a plurality of molds placed on top of each other and forming a mold stack, said mold stack placed and firmly held in said holder, apertures at the center of the molds forming a free passage through the mold stack and connected with each mold by a pouring canal, a mold seat at the bottom of the holder, an aperture in said mold seat offset at its upper end permitting the insertion of either a nipple, for pouring molten metal into the mold from the bottom, or a solid plug for preventing the escape of melted metal poured in from the top, a cover set upon the mold stack, an aperture therein, broadening at its upper end to a funnel for facilitating either the pouring in of liquid metal, or the watching of the rising metal poured in from the bottom through the mold seat, means for rotating said mold holder during the pouring operation if so desired.

6. A mold holder, a plurality of molds stacked into a column, embraced and firmly held together by said mold holder, separating sheets between said molds, apertures at the mold centers forming a through passage way for liquid metal, canals connecting said passage way with the form impressed into each mold and means for permitting the pouring in of liquid metal into said molds by way of the center passage from either top or bottom.

7. In combination with a casting device for making multiple castings, a base member, having an inlay of refractory material, for supporting flaskless molds, a sectional shell, interlocking with said base member, for aligning said molds, a cover resting upon said shell, a refractory inlay in said cover, a funnel-shaped opening in said refractory inlay and means for readily assembling and taking apart all of said combination.

8. In combination with a casting device for making multiple castings as set forth in claim 7, means for permitting the pouring of molten metal into said mold from either top or bottom.

9. In combination with a casting device as set forth in claim 8, separating plates between the molds for confining the molten metal to each individual mold.

10. In combination with a casting device as set forth in claim 9, separating plates between each mold made of burnable material and serving for the purpose of first defining the cast metal to each individual mold, and second for providing passages for escaping gases.

Signed at the city of New York, in the county of New York and State of New York, this 23d day of August A. D. 1918.

HARRY S. FRANK.

Witnesses:
 MORTON MILLER,
 D. B. MILLER.